Nov. 29, 1949  R. F. WILD  2,490,010
MEASURING AND CONTROLLING APPARATUS
Filed Feb. 1, 1947
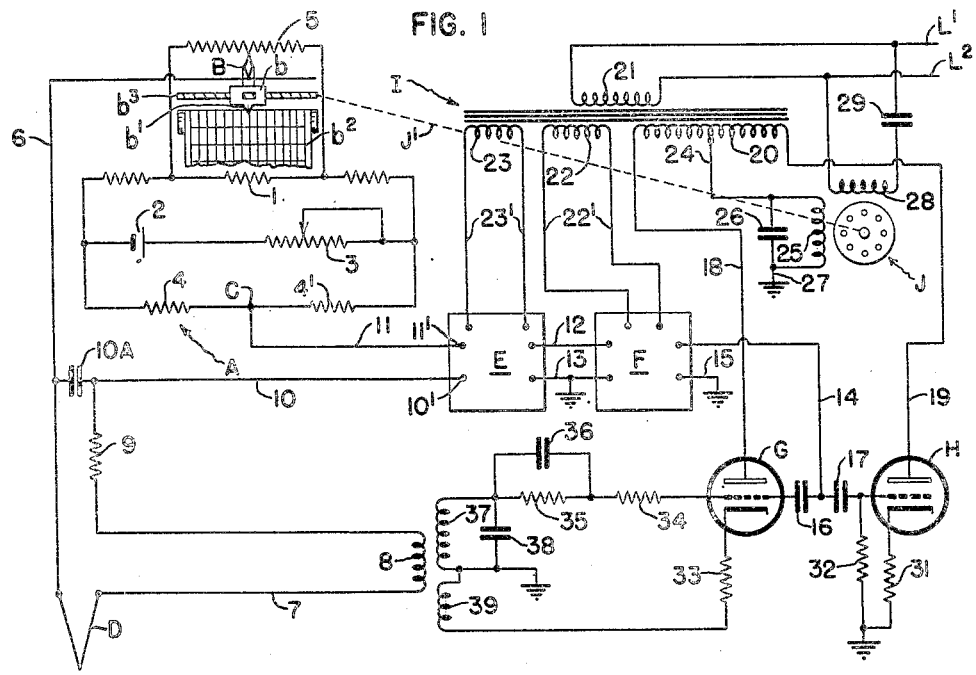
INVENTOR.
RUDOLF F. WILD
BY Arthur H. Swanson
ATTORNEY Patented Nov. 29, 1949

2,490,010

UNITED STATES PATENT OFFICE 2,490,010

MEASURING AND CONTROLLING APPARATUS

Rudolf F. Wild, Philadelphia, Pa., assignor, by mesne assignments, to Minneapolis-Honeywell Regulator Company, Minneapolis, Minn., a corporation of Delaware Application February 1, 1947, Serial No. 725,761

20 Claims. (Cl. 318—28)

The present invention relates to measuring apparatus of the character comprising a circuit network operating to create an electrical signal varying in predetermined accordance with variations in a quantity being measured, and including an electronic amplifying and control system through which said signal is amplified and utilized to produce measuring or control, or both measuring and control, effects. The invention may be used with especial advantage in self-balancing potentiometric measuring apparatus of the well known and widely used conversion type. In such use, the signal which is produced and amplified controls the operation of a reversible rebalancing motor, which motor may also produce control effects in addition to the rebalancing effects.

The general object of the present invention is to provide measuring and control apparatus of the above mentioned character with improved means for detecting the development of a defect or defects in the apparatus, and upon such detection, for causing the apparatus to fail safely. In one form illustrated herein, the invention is operative to detect a thermocouple break or other open circuit condition in the measuring branch of the circuit network of a self-balancing potentiometer. In another form illustrated herein, the invention is adapted to detect a break or defect occurring in the bridge circuit or in the electronic amplifying and control system as well as to detect a break occurring in the measuring branch of the self-balancing potentiometric network.

A primary object of the invention is to provide simple and effective means of novel character for so biasing the power stage of the electronic amplifying and motor drive system of the kind included in said conversion type potentiometer, that the detection of a defect in the apparatus will cause the rebalancing motor to operate in the upscale direction.

In each of its above mentioned forms, the rebalancing motor is operated on the detection of a defect to give an upscale adjustment to the potentiometer indicator or recorder, and may also operate to simultaneously produce some other corrective effect. The upscale adjustment, which is given the potentiometer indicator or recorder on the detection of a defect, is itself a corrective effect indicating to the user that the apparatus is defective. Moreover, in the operation of the usual form of control potentiometer including a control valve or a control switch, the movement of the indicator or recorder upscale above the control point from a normal position will adjust the control valve or switch in the manner required to effect a so-called safe failure of the apparatus.

A more specific object of the invention is to provide a coupling between a measuring circuit branch and a motor drive system including or associated with an electronic oscillating circuit which will be caused to oscillate or will be kept from significant oscillation by changes in the condition of the measuring apparatus.

Thus, in one form of the invention, the oscillating circuit oscillates significantly only on the detection of a defect, and its oscillation modifies the bias on one of the two motor driving electronic valves of the motor drive system so as to produce upscale operation of the rebalancing motor.

In another form of the invention, the oscillator creates high frequency oscillations during periods in which the apparatus is free from detectable defects, and ceases to oscillate on the development of a detectable defect. In the last mentioned form of the invention, the interruption of the oscillations of the oscillator so modifies the bias on one of the motor drive valves as to cause upscale operation of the motor.

The present invention is characterized, in particular, by the easy and relatively inexpensive manner in which a conversion type potentiometer of standard commercial form can be adapted for the use of the present invention.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Of the drawings:

Fig. 1 is a diagram illustrating one embodiment of the invention;

Fig. 2 is a diagram illustrating a second embodiment of the invention; and

Figs. 3 and 4 are diagrams illustrating modifications of the circuit shown in Fig. 2.

In Fig. 1 I have illustrated the use of a simple form of the present invention in connection with a self-balancing potentiometer of the well known conversion type. As diagrammatically shown in Fig. 1, the apparatus comprises a potentiometric bridge circuit A comprising a first branch including a resistor 1, a second or energizing branch including an energizing battery 2 and an adjustable resistor 3 in series with this battery, and a third branch including series connected resistors 4 and 4'. The first and third branches are connected in parallel with one another, and in parallel with the second branch. As shown, the resistor 1 is shunted by a slide wire resistance 5. The slide wire resistance 5 is engaged by a slider contact B. As shown, the contact B is mounted on a recorder carriage $b$. The latter carries a marking element $b'$ for recording the value of the quantity measured on a record sheet or chart $b^2$. As diagrammatically shown, the carriage $b$ is adjusted longitudinally along the slide wire 5 by a feed screw $b^3$, which is rotated by the rotation of a reversible rebalancing motor J. The latter has its drive shaft connected by an element J' to the feed screw $b^3$.

The potentiometric circuit is included in a measuring circuit which also includes a measuring branch comprising a conductor 6 connecting the contact B to one terminal of a thermocouple D, a conductor 7, a coil or inductive winding 8, a damping resistor 9, a conductor 10, the input circuit of a conversion element E, and a conductor 11, all of which are connected in series with one another between the contact B and the bridge circuit point C, at which point the resistors 4 and 4' are connected. The input circuit of the element E comprises an input terminal 10' connected to the resistor 9, and a second input terminal 11' connected to the bridge circuit at the point C. A damping condenser 10A is connected between the conductors 6 and 10.

Although the thermocouple branch of the measuring circuit shown in Fig. 1 includes the winding 8, not included in the corresponding branch of conventional potentiometers, that winding has no operative effect in the normal operation of the apparatus. Therefore, while in its operative condition, the thermocouple branch of Fig. 1 does not differ operatively from the corresponding branch of a conventional potentiometer. However, the winding 8 does produce an important operative effect for the purposes of the present invention, as is hereinafter explained.

In the normal operation of the standard conversion type potentiometer, the voltage of the thermocouple D is opposed to the potential drop in the potentiometric bridge circuit between the slider contact B and the fixed bridge point C. When said potential drop is equal in magnitude and opposite in direction to the thermocouple voltage, the measuring system is balanced. When thereafter the temperature of the thermocouple D increases or decreases, the resultant rise or fall in the thermocouple voltage then unbalances the measuring system, and the conversion element E initiates a rebalancing operation of the motor J. In that operation the motor J adjusts the slider contact B into a new position, in which the potential drop between the slider contact B and the fixed bridge point C again becomes equal and opposite to the thermocouple voltage, thereby rebalancing the system.

Thus in the arrangement shown in Fig. 1, current flow through the input circuit of the element E indicates that the measuring system is unbalanced, and on such current flow, the motor J is energized for operation through the connection element J' and the feed screw $b^3$ to adjust the contact B along the slide wire resistor 5, in the direction and to the extent required to rebalance the measuring system and thereby interrupt the current flowing through the input circuit of the element E.

As shown diagrammatically, the element E controls the operation of the motor J through a voltage amplifier F and motor drive triodes G and H, all as in the standard conversion type potentiometer, wherein the amplifier F is a three stage electronic amplifier including three amplifying triodes and a rectifier supplying plate current to said triodes. The output terminals of the converter E are connected by conductors 12 and 13 to the input terminals of the amplifier F. As shown, one output terminal of the amplifier F is coupled by a conductor 14 and a condenser 16 to the control grid of the triode G, and by the conductor 14 and a condenser 17 to the control grid of the triode H. The second output terminal of the amplifier F is connected to ground by a conductor 15, and the cathodes of triodes G and H are also connected to ground through connections to be hereinafter described.

Anode current is supplied to the valves G and H through conductors 18 and 19 connected to the opposite ends of the secondary winding 20 of a transformer I, which has its primary winding 21 connected across supply conductors L' and L². The latter may be included in an ordinary distribution system and are assumed herein to supply current at approximately 115 volts at a frequency of 60 cycles per second, though widely different frequencies and voltages may be employed. The transformer I has two other secondary windings, 22 and 23. The winding 22 is connected by conductors 22' to the amplifier F to energize the rectifier therein. The winding 23 supplies energizing current through conductors 23' to the alternating current energized vibrator or circuit interrupter of the conversion element E. The midpoint of the transformer secondary winding 20 is connected to a ground connection 27 through a conductor 24 and the control winding 25 of the motor J, and a condenser 26 is connected in parallel with the winding 25. The motor J includes a power winding 28 which is connected across the supply conductors L' and L² in series with a condenser 29.

In the normal operation of the apparatus shown in Fig. 1, as it has been described, unbalance of the measuring circuit results in a unidirectional current flow in one direction or the other direction through the input circuit of the conversion element E. The latter operates to create an alternating output voltage or signal of the frequency supplied by the supply conductors L' and L² which is in phase or is 180° out of phase with the voltage across the supply conductors L' and L² accordingly as the unidirectional current flow through the thermocouple and input circuit of the element E is in one direction or the other. The direction of that current flow is dependent, of course, on whether the voltage drop between slider contact B and fixed point C of the bridge circuit exceeds, or is less than, the voltage of the thermocouple D.

The phase of the alternating current signal in the output circuit of the element E, which signal is amplified in the amplifier F and then applied to the control grids of the valves G and H through the conductor 14 and condensers 16 and 17, determines the resultant direction of operation of the motor J. The direction of rotation of the motor depends upon which of the valves G and H passes the larger amount of alternating current of 60 cycle frequency to the motor control winding 25. It is assumed herein that the motor J operates to adjust the slider contact B upscale or downscale accordingly as the effective plate current flow through the valve H exceeds, or is less than, the effective plate current flow through the valve G. When the voltage drop between the slider contact B and fixed point C is less than, or exceeds, the voltage of the thermocouple, the motor J operates to adjust the slider contact B in the upscale direction or in the downscale direction, respectively, thereby to make said voltage drop equal in magnitude to the thermocouple voltage.

Insofar as above described, the apparatus shown diagrammatically in Fig. 1 is well known and is a typical example of the conversion type potentiometer, which it is the special object of the present invention to improve. The conversion type potentiometer is disclosed and claimed in the application of Walter P. Wills, Ser. No. 421,173, filed December 1, 1941, which issued as Patent No. 2,423,540 on July 8, 1947, and is also disclosed in the Wills Patent No. 2,385,481, granted September 5, 1945. Further references herein to the form and operation of the means diagrammatically illustrated for controlling the normal operation of the motor J are, therefore, unnecessary.

The apparatus shown diagrammatically in Fig. 1 does not differ significantly from the conventional form of the conversion potentiometer except in respect to the coupling shown in Fig. 1 between the measuring circuit branch, including the thermocouple D, and the motor drive valve G, and in the connections to the control grids of the motor drive valves G and H. These differences between the circuit diagram shown in Fig. 1 and a corresponding diagram for the conventional form of the conversion potentiometer are without significant operative effect in the normal operation of the apparatus shown in Fig. 1.

In the conventional form of the standard conversion type potentiometer, the control grids of the two motor drive valves, corresponding to the valves G and H of Fig. 1, are connected to the output circuit of the voltage amplifier through a single condenser and are connected to ground through a common resistor, and the cathodes of both motor drive valves are connected to ground through a common resistor.

In Fig. 1, the output terminal 14 of the voltage amplifier F is connected to the control grids of the valves G and H through separate condensers 16 and 17, respectively, thus making it possible to maintain different D. C. potentials on the control grids of the valves G and H. The cathode of the valve H is connected to ground through a cathode bias resistor 31, and the control grid of the valve H is connected to ground through a grid resistor 32. The cathode of the valve G is connected to ground through a resistor 33 and an inductive winding 39 in series with said resistor. The control grid of the valve G is connected to ground through a circuit including resistors 34 and 35 and a winding 37, all in series with one another. A condenser 36 is connected in parallel with the resistor 35, and a condenser 38 is connected in parallel with the winding 37. The windings 37, 39 and 8 are all inductively coupled and in practice may all be wound on the same coil form.

The described connections of the control grid with the cathode of the valve G provide a typical oscillating circuit, adapted for oscillation with a frequency substantially equal to the resonant frequency of the parallel connected winding 37 and condenser 38, unless and except as oscillation is prevented or materially reduced in amplitude by the loading action of the winding 8. This frequency is advantageously made to have such a value that sufficient loading of the oscillator circuit by the thermocouple circuit is obtained, without affecting normal operation of the apparatus.

In normal operation, with properly proportioned coil elements or windings 8, 37 and 39, the low impedance of the circuit including the thermocouple D, damping resistor 9, winding 8 and condenser 10A will so heavily load the oscillator circuit as to greatly reduce or totally prevent oscillation therein. When oscillation is thus prevented, or reduced to an insignificant value, there is no significant difference between the operation and operative effects of the motor drive valves G and H of Fig. 1, and the corresponding valves of the standard conversion type potentiometer. The capacitance of the by-pass condenser 36 is too small to have significant by-pass action in normal operation with 60 cycle current, and the apparatus may be so proportioned that the impedances in the grid circuits of the valves G and H are not significantly different from those customarily in the grid circuits of the corresponding valves of the conversion type potentiometer.

If the thermocouple D of Fig. 1 burns out, or other break in the circuit branch including the thermocouple D, coil 8, condenser 10A and resistor 9 occurs, the heavy load normally put upon the oscillator by this circuit branch disappears, and the coil 8 then reflects a high impedance, i. e., substantially that of an open circuit or an infinite impedance, into the oscillator circuit. In consequence, oscillation in the oscillator circuit then occurs, with the result that a grid bias voltage is developed across the grid resistor 35 which is of sufficient magnitude to greatly reduce the anode current of the valve G relative to the anode current of the valve H. This results in a positive upscale drive of the slider contact B. That upscale drive will continue until the slider reaches the upper limit of its movement, whereupon the upscale movement is interrupted as by customary limit switch provisions, not shown.

Such movement of the slider contact is of itself a corrective action, indicating to the operator in charge that some abnormal condition has developed. Moreover, when the potentiometer is used for control purposes, the mechanism for moving the slider contact is customarily employed to effect a corrective adjustment of a control or switch, when the slider contact moves away from its control point position in either direction. Thus in controlling the temperature of a furnace, for example, when the slider contact is moved away from its normal value or control point position in the upscale direction on an increase in the furnace temperature, the customary control action then effected is the adjustment of a control valve or switch to reduce or interrupt the supply of heat to the furnace heater. The adjustment thus given the control valve or switch on an upscale movement of the slider contact is the adjustment required to insure safe failure when the upscale movement is not due to an increase in the heater temperature, but is due to a thermocouple break. Since the safe failure action obtained with the apparatus shown in Fig. 1 results from a modification of the bias voltage of the valve G which is produced only upon a break in the thermocouple circuit and not during normal operation, the use of the invention in the form shown does not interfere with the calibration of the measuring circuit or with the operation of automatic standardizing mechanism, not shown herein, but customarily included in self-balancing potentiometers of the conversion type.

In Fig. 2, I have illustrated a modification of the apparatus shown diagrammatically in Fig. 1 which differs from the Fig. 1 apparatus in respect to the means for coupling the measuring circuit to the output circuit of the electronic amplifying and motor drive system, in respect to the means for biasing the motor drive valves G and H, and in respect to the form of the measuring branch of the measuring circuit. In the arrangement shown in Fig. 2, the output circuit of the amplifier and motor drive system is coupled by a transformer K to the input circuit of the amplifying system for the continuous transfer of energy, during normal operation of the apparatus, from the said output circuit to said input circuit. In consequence of this fact, and of the special form of the measuring circuit branch as hereinafter described, the high frequency oscillating current flow normally maintained is interrupted, and safe failure of the apparatus is insured, upon a failure in the amplifying apparatus itself, upon a failure in the bridge circuit, or upon a break in the thermocouple D or the measuring circuit branch including the latter.

The coupling transformer K shown in Fig. 2 may be of conventional form and preferably has its magnetic core K' adjustable so as to vary the mutual inductance of the transformer secondary and primary windings 40 and 41. The secondary winding 40 is connected in the thermocouple circuit in series between the conductors 7 and 10. The primary winding 41 has one terminal connected to ground by the connection 27. The second terminal of the winding 41 is connected by a conductor 27' to one terminal of the motor control winding 25, the other terminal of which is connected by conductor 24 to the midpoint of the secondary winding 20 of the transformer I. In parallel with the winding 41 is connected a tuning condenser 42, forming a high frequency resonant circuit which is preferably tuned to a frequency between 10 and 25 kilocycles. The conductor 27' connected to the primary winding 41 is also connected to the control grid of the motor drive valve H. The connection between the conductor 27' and this grid comprises a conductor 43, a bias resistor 44, a high frequency by-pass condenser 45 connected in parallel with the resistor 44, a conductor 46, and a grid resistor 47.

In Fig. 2, one terminal of the thermocouple D is connected to one input terminal of the conversion element E by a connection which includes the conductors 7 and 10 and differs from the corresponding connection of Fig. 1 only in the omission of the damping resistor 9 and in the substitution of the secondary winding 40 of the transformer K for the coil 8 of Fig. 1. The second terminal of the thermocouple D is connected to the slider contact B through resistors 9A and 9B and the conductor 6, all connected in series. In Fig. 2, the condenser 10A connects the conductor 10 to the junction point of the resistors 9A and 9B. The last mentioned terminal of the thermocouple D is also connected to the bridge point C through a condenser 10B and the conductor 11. The resistor 9A serves damping purposes, and the resistor 9B minimizes the effect of changes in resistance in the potentiometric circuit between the point C and contact B occurring as the latter is moved along the slide wire resistance 5.

In the normal operation of the apparatus shown in Fig. 2, the transformer K transfers energy from the output circuit of the amplifying and motor drive system to the input circuit of that system and thus normally maintains an oscillating current flow through the system of a frequency which is substantially the resonant frequency of the circuit portion including the winding 41 and its tuning condenser 42. In consequence of the connection of the control grid of the valve H to the oscillating circuit including the winding 41 and the condenser 42, a grid bias voltage is developed by grid detection across the resistor 44. As those skilled in the art will recognize, by a suitable selection of circuit element values, said bias voltage may be made effectively equal to the cathode bias voltage produced across the cathode resistor 31' of the motor drive valve G. Thus as long as high frequency oscillations are being generated, the power amplifier including the valves H and G is balanced, except as it is unbalanced by the low frequency signal from the amplifier F during periods in which the measuring system is unbalanced.

If the thermocouple D burns out, thus opening the feed-back circuit for generation of oscillations, or if any other component of the apparatus fails and thereby causes cessation of the oscillations, the grid bias voltage across the resistor 44 will disappear, while the voltage developed across the cathode resistor 31' of the valve G will remain. In consequence of such a bias change, the anode current drawn by the valve H will then be considerably greater than that drawn by the valve G, with the result that the motor J will operate to produce an upscale adjustment of the slider contact B. Such upscale adjustment of the slider contact B results in a safe failure of the apparatus shown in Fig. 2 just as is effected with the apparatus shown in Fig. 1 wherein a thermocouple break initiates oscillation in the oscillator circuit.

In the circuit arrangement shown in Fig. 2, there are three circuit branches through which high frequency current may flow connected in parallel between the conductors 7 and 10 which in turn are connected to the ends of the coupling transformer secondary winding 40. One of said three circuit branches includes the damping resistor 9A, the thermocouple D, and the condenser 10A. Another of said three circuit branches includes the condenser 10A, the resistor 9B, the slider contact B, bridge point C, condenser 10B, thermocouple D, and the potentiometric circuit A connecting contact B and point C. The third of said circuit branches includes the thermocouple D, the condenser 10B, and the input circuit of the conversion element E between the terminals 10' and 11'. If a break occurs in either the first or last of the branch circuits just mentioned, the path for high frequency current flow between the conductors 7 and 10 formed by the high frequency current circuit branches remaining intact is not effective to maintain the high frequency oscillations. Furthermore, an incipient failure in the thermocouple D not involving the actual breakage of the thermocouple may result in such an abnormal increase in the thermocouple resistance as to interrupt the high frequency oscillations. If a break occurs in the second mentioned high frequency current circuit branch including the potentiometric circuit A, the resulting unbalance signal fed to the amplifier F will be of such magnitude as to cause the disappearance of the high frequency oscillations.

Notwithstanding their differences in respect to the production and mode of utilizing oscillating currents, the apparatus shown in Fig. 2 and the apparatus shown in Fig. 1 are generally alike in that each normally actuates its self-balancing motor J to effect a rebalancing operation on variations in the temperature of the thermocouple D, just as the rebalancing motor of standard conversion type self-balancing potentiometer is actuated to effect a rebalancing operation upon a change in the condition being measured.

In the normal operation of the apparatus shown in Fig. 2, a high frequency oscillating current flow in the amplifying system is continuously maintained when the measuring system is in balance and the motor J is stationary, and when the system is unbalanced and the motor J is in normal operation. With the standard amplifying and control system included in the apparatus diagrammatically shown in Fig. 2, the high frequency oscillating current is ordinarily maintained only during alternate half cycles of the 60 cycle supply voltage used in energizing the system. This is due to the fact that the phasing of the transformer included in the conversion element E changes during each half cycle, and only one phase is well adapted for the generation of high frequency signals.

In ordinary operation, the high frequency oscillations are produced in intermittent bursts which occur 60 times per second, each burst continuing for not more than $1/120$ of a second. During periods in which the motor J is in normal operation, the high frequency oscillations ride through the amplifying system on top of any 60 cycle signal of normal amplitude which may be impressed on the amplifying and control apparatus by the conversion element E as a result of unidirectional current flow in the input circuit of that element.

The normally maintained high frequency signal is clipped or interrupted as a result of cut-off and/or saturation in the final stage of the three stage amplifier F on and as a result of an abnormal increase in the 60 cycle signal produced by the development of any one of the following operative defects, namely: an abnormal increase in the measuring system resistance, failure of any one of the voltage amplifier valves, or the development of a defect in the control system causing any one of the amplifying tubes to be overdriven.

An abnormal increase in the measuring circuit resistance which will interrupt the high frequency oscillations may be caused by a break in, or the abnormal increase in the resistance of, either of the two specified circuit branches forming high frequency current paths of flow between the output terminals of the transformer K. Thus the high frequency current flow will be interrupted not only on a breakage in the thermocouple D, but also when an incipient thermocouple failure results in a substantial increase in the thermocouple resistance. Normally, the resistance of the thermocouple D is so small as to be negligible in this connection, but in an incipient stage of failure the thermocouple resistance may increase to one or two hundred ohms before the actual thermocouple breakage occurs. Such an increase in the thermocouple resistance will reduce or interrupt the high frequency current flow through all of its paths of flow in the input circuit portion of the amplifying and control system.

The conditions of operation under which the high frequency signals will, or will not, ride through the amplifier on the 60 cycle signals may be varied by changing the amplitude of either or both of said signals. In ordinary practice, the apparatus must be so proportioned and arranged that the normal amplitude of the 60 cycle signals is that required to insure the desired operating characteristics of the rebalancing motor J, but this does not preclude a high frequency signal amplitude that will make that signal readily detectable in the amplifier output circuit at all times in which the 60 cycle signal is not abnormally high.

In this connection assume that the apparatus is so proportioned and arranged that with intermediate values of the two signal currents, the high frequency signal will appear in the amplifier output circuit superimposed upon the peak portions of the low frequency signal current. In such case, the extent of increase in the low frequency signal current required to prevent the appearance of the high frequency signal in the output circuit may be increased and decreased by respectively increasing and decreasing the high frequency signal current.

In my prior application, Serial No. 678,255, filed June 21, 1946, now Patent Number 2,457,791, issued December 28, 1948, I have disclosed and claimed improved self-balancing potentiometric measuring and control apparatus in which high frequency oscillations are produced and caused to disappear in the same general manner in which they are produced and caused to disappear in the apparatus shown in Fig. 2 hereof. Furthermore, in said prior application I have explained how such apparatus may be proportioned and operated so that the interruption of the high frequency oscillations as a result of apparatus failures of the kind mentioned above may be utilized for safe failure purposes.

The means disclosed herein for utilizing the disappearance of the high frequency oscillations from the amplifying and motor drive system are substantially simpler and less expensive than those disclosed in my prior application. It is to be noted in particular that the use of the present invention in the form shown herein requires the addition of no electronic valve to the circuit of the standard conversion potentiometer, and that the only required additions to the standard conversion potentiometer are a relatively simple coupling device and a few relatively inexpensive condensers and resistors.

As those skilled in the art will understand, various changes may be made in the form of the apparatus disclosed. Thus, for example, with the control grid of the valve H of Fig. 2 coupled by way of the coupling condenser 17 to the anode of the final stage amplifier valve of the amplifier F, it may be found desirable to by-pass the grid resistor 47 with a small high frequency by-pass condenser 48 as shown in Fig. 3. Alternatively, it is feasible to omit the grid leak resistor 47, and to include only the bias resistor 44 and the condenser 45 in parallel therewith in the connection between the transformer primary terminal and the control grid of the valve H, as shown in Fig. 4. In such case, the resistor 44 and condenser 45 should be proportioned to produce the entire bias effect impressed on the control grid of the valve H.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Measuring apparatus comprising a circuit network including means adapted to create an electrical signal varying in predetermined accordance with variations in a quantity being measured, an electronic amplifying system having an input circuit to which said signal is applied for amplification and having an output circuit in which the amplified signal appears, the signal appearing in said amplifier output circuit having a phase and a magnitude respectively dependent upon the direction and the extent of variations in the quantity being measured, said apparatus being arranged to generate oscillations dependent upon the occurrence or non-occurrence of a predetermined defect in said apparatus but independent of the variations in the quantity being measured, and control means including electronic valve means forming a portion of the circuit path for said oscillations when the latter are present in said apparatus and connected to said output circuit and arranged to be jointly responsive to said amplified signal and to said oscillations and operative to produce control effects in opposite directions upon predetermined changes in said amplified signal in the absence of said predetermined defect, and operative to produce control effects in only one direction upon the occurrence of said predetermined defect.

2. Measuring apparatus comprising a circuit network including means adapted to create an electrical signal varying in predetermined accordance with variations in a quantity being measured, an electronic amplifying system having an input circuit to which said signal is applied for amplification and having an output circuit in which the amplified signal appears, said apparatus being arranged to generate oscillations dependent upon the occurrence or non-occurrence of a predetermined effect in said apparatus, and control means connected to said output circuit and arranged to be jointly responsive to said amplified signal and to said oscillations and operative to produce control effects in opposite directions upon predetermined changes in said amplified signal in the absence of said predetermined defect, and operative to produce control effects in only one direction upon the occurrence of said predetermined defect, said control means including a pair of electronic valves each having a control grid connected to said output circuit and having an anode and a cathode included in an anode circuit adapted to have anode current flowing therein, and including means responsive to said oscillations for varying the bias relation of the control grid and the cathode of one of said valves thereby to make the relative magnitudes of the anode currents flowing in said anode circuits dependent on, or independent of, said amplified signal for producing said control effects in opposite directions or only in said one direction.

3. Measuring apparatus comprising a circuit network including means adapted to create an alternating current signal varying in phase in accordance with predetermined variations in a quantity being measured, an electronic amplifying system having an input circuit on which said signal is applied for amplification and having an output circuit in which the amplified signal appears, and control means connected to said output circuit and operating in selective accordance with the operative condition of said apparatus to maintain an oscillating current flow in a portion of said apparatus when the latter is in one condition and to prevent said oscillating current flow during periods in which said apparatus is in a different condition of operativeness, said apparatus having one or more defects when in one of said conditions and being free from said defects when in the other of said conditions, said control means including means connected to said output circuit and adapted to produce two control currents differing approximately 180° in phase from one another and actuated by said amplified signal to make one or the other of said currents predominant, depending on the phase of said signal when said apparatus is free from said defects, and operating independently of the phase of said signal to make a predetermined one of said control currents predominant when said apparatus has one or more of said defects.

4. Measuring apparatus comprising a circuit network including means adapted to create an electrical signal varying in predetermined accordance with variations in a quantity being measured, an electronic amplifying system having an input circuit to which said signal is applied for amplification and having an output circuit in which the amplified signal appears, the signal appearing in said amplifier output circuit having a phase and a magnitude respectively dependent upon the direction and the extent of variations in the quantity being measured, means adapted to transfer energy from one portion to another portion of said apparatus thereby to maintain an oscillating current flow in said network when said apparatus is free from predetermined defects but not when one or more of said defects exists, said oscillating current flow being independent of the variations in the quantity being measured, and control means connected to said output circuit and including electronic valve means forming a portion of the circuit path for said oscillating current flow when the latter is present in said apparatus and responsive to the flow of said oscillating current in said network and including means responsive to said amplified signal and operative to produce control effects in opposite directions on predetermined changes in said signal occurring during periods in which said oscillating current flow is being maintained, and operative to produce effects in one only of said directions when said oscillating current flow is not being maintained.

5. Measuring apparatus comprising a circuit network including means adapted to create an electrical signal varying in predetermined accordance with variations in a quantity being measured, and comprising an electronic amplifying and control system having an input circuit on which said signal is applied for amplification and having an output circuit in which the amplified signal appears, means coupling said input and output circuits for the transfer of energy from said output circuit to said input circuit thereby to maintain an oscillating current flow in said network when said apparatus is free from predetermined defects, but not when one or more of said defects exists, said oscillating current flow being independent of the variations in the quantity being measured, said system including means responsive to flow of said oscillating current and including means responsive to said amplified signal and operative to produce control effects in opposite directions on predetermined changes in said signal occurring during periods in which said oscillating current flow is being maintained, and operative to produce effects in one only of said directions when said oscillating current flow is not being maintained.

6. Measuring apparatus comprising a circuit network including means adapted to create an alternating current signal of predetermined frequency and varying in phase in accordance with predetermined variations in a quantity being measured, an electronic amplifying system having an input circuit on which said signal is applied for amplification and having an output circuit in which the amplified signal appears, and control means connected to said output circuit and including means operating in selective accordance with the operative condition of said apparatus to maintain an oscillating current flow in a portion of said apparatus when the latter is in one condition and to prevent said oscillating current flow during periods in which said apparatus is in a different condition of operativeness, said apparatus having one or more defects when in one of said conditions and being free from said defects when in the other of said conditions, a pair of electronic valves each having a control grid connected to said output circuit and having an anode and a cathode included in a respective anode circuit, means adapted to impress an alternating current voltage of said predetermined frequency on each of said anode circuits and adapted to maintain an alternating current flow in each anode circuit which is approximately 180° out of phase with the current flow in the other anode circuit, and means responsive to said oscillating current flow for varying the bias relation of the control grid and cathode of one of said valves thereby to make the relative magnitudes of the alternating currents flowing in the two anode circuits dependent on said amplified signal during periods in which said apparatus is free from said defects, and substantially independent of said amplified signal during periods in which one or more of said defects exists.

7. Measuring apparatus comprising a circuit network including means adapted to create an alternating current signal of predetermined frequency and of one phase or of the opposite phase depending on a predetermined variation in a quantity being measured, an electronic amplifying system having an input circuit on which said signal is applied for amplification and having an output circuit in which the amplified signal appears, and control means connected to said output circuit and including means operating in selective accordance with the operative condition of said apparatus to maintain an oscillating current flow in a portion of said apparatus when the latter is in one condition and to prevent said oscillating current flow during periods in which said apparatus is in a different condition of operativeness, said apparatus having one or more defects when in one of said conditions and being free from said defects when in the other of said conditions, a pair of electronic valves each having a control grid connected to said output circuit and having an anode and a cathode included in a respective anode circuit, means adapted to impress an alternating current voltage of said predetermined frequency on each of said anode circuits and adapted to maintain an alternating current flow in each anode circuit which is approximately 180° out of phase with the current flow in the other anode circuit and which has a phase that is substantially the same as one of the two first mentioned phases, and means responsive to said oscillating current flow for varying the bias relation of the control grid and cathode of one of said valves thereby to make the relative magnitudes of the alternating currents flowing in the two anode circuits dependent on the phase of said amplified signal during periods in which said apparatus is free from said defects, and substantially independent of said amplified signal during periods in which one or more of said defects exists.

8. Measuring apparatus as specified in claim 3, including a reversible alternating current motor having a control winding energized by said anode currents.

9. Apparatus as specified in claim 6, in which the portion of said apparatus in which said oscillating current flow is maintained comprises the input circuit of said valve having its bias relation controlled by said flow.

10. Apparatus as specified in claim 6, in which the portion of said apparatus in which said oscillating current flow is maintained comprises the input circuit of the said valve having its bias relation controlled by said flow, and in which said oscillating current is substantially prevented from flowing when said apparatus is free from said defects.

11. Apparatus as specified in claim 6, wherein the portion of said apparatus in which said oscillating current flow is maintained includes the portion of said electronic amplifying system between said input and output circuits.

12. Apparatus as specified in claim 6, wherein the portion of said apparatus in which said oscillating current flow is maintained includes the portion of said electronic amplifying system between said input and output circuits, and wherein said oscillating current is substantially prevented from flowing when said apparatus has one or more of said defects.

13. Apparatus as specified in claim 6, including a coupling between said input circuit and said anode circuits, said coupling comprising a transformer and adapted to maintain or fail to maintain said oscillating current flow accordingly as said system is free from said defects or is not free from one or more of said defects, and in which said means responsive to said oscillating current flow for varying the bias relation of the control grid and cathode of said one valve includes at least one grid resistor and a condenser connected in parallel with said one resistor.

14. Apparatus as specified in claim 6, including a coupling between said input circuit and said anode circuits, said coupling comprising a transformer and adapted to maintain or fail to maintain said oscillating current flow accordingly as said system is free from said defects or is not free from one or more of said defects, and in which said means responsive to said oscillating current flow for varying the bias relation of the control grid and cathode of said one valve includes a first grid resistor, a second grid resistor connected in series with said first resistor, and a condenser connected in parallel with said second resistor.

15. Apparatus as specified in claim 6, including a coupling between said input circuit and said anode circuits, said coupling comprising a transformer and adapted to maintain or fail to maintain said oscillating current flow accordingly as said system is free from said defects or is not free from one or more of said defects, and in which said means responsive to said oscillating current flow for varying the bias relation of the control grid and cathode of said one valve includes a first grid resistor, a second grid resistor connected in series with said first resistor, a first condenser connected in parallel with said first resistor, and a second condenser connected in parallel with said second resistor.

16. Apparatus as specified in claim 6, including a coupling between said input circuit and said anode circuits, said coupling comprising a transformer and adapted to maintain or fail to maintain said oscillating current flow accordingly as said system is free from said defects or is not free from one or more of said defects, and in which said means responsive to said oscillating current flow for varying the bias relation of the control grid and cathode of said one valve includes only one grid resistor and a condenser connected in parallel with said resistor.

17. Self-balancing potentiometric measuring and control apparatus comprising a potentiometric circuit including a slide wire resistor and a cooperating slider contact, a measuring circuit branch including a pair of terminals adapted to be connected to a source of variable voltage to be measured and connected between said contact and a point in said circuit differing in potential from said contact by an amount which balances said voltage when said contact is in a balancing position, a reversible motor having a control winding and normally operable to adjust said contact into a new balancing position on a change in said voltage, an electronic amplifying and motor drive system having an input circuit and an output circuit, energizing means adapted to supply alternating current of relatively low frequency to said system, a conversion element connecting said measuring circuit branch to said input circuit and normally operative when energized to convert a unidirectional current flow in said branch into an alternating current signal of said low frequency and of one phase or a substantially opposite phase dependent on the direction of said current flow, an electronic valve included in said system and having a control grid, an anode, and a cathode, said anode and cathode being connected in an anode circuit which is adapted to be supplied with anode voltage by said energizing means and which is connected to and adapted to supply pulsating current to said control winding, means normally cooperating with said valve and adapted to energize said motor for upscale or downscale adjustment of said slider contact as said anode current is respectively decreased or increased, and in combination with the apparatus hereinbefore specified, means forming an oscillating circuit connected to said control grid, said anode and said cathode which is operative or not operative to generate oscillating currents in said oscillating circuits, depending upon the operativeness of said apparatus, and means operative to vary the relative potentials of said cathode and said control grid as oscillations are created and interrupted thereby to effect upscale operation of said motor upon the development of one or more predetermined defects in said apparatus.

18. Apparatus as specified in claim 17, in which said oscillating circuit comprises a connection between said control grid and said cathode including a grid resistor, a first inductance in series with said grid resistor, and a tuning condenser in parallel with said first inductance, in which a connection between said cathode and said anode includes a bias resistor and a second inductance, and in which a third inductance is connected in said measuring circuit branch, said third inductance being in mutual inductive relation with said first and second inductances, being operative to prevent said oscillating circuit from oscillating while the circuit connection between the terminals of said third inductance, formed by said measuring circuit branch, is in an operative condition and provides a path of flow for the oscillating current between the last mentioned terminals, which path is of relatively low impedance, and being operative to permit oscillating current to flow in said oscillating circuit when said circuit connection between said last mentioned terminals is in a defective condition and does not provide a flow path of relatively low impedance for the oscillating current.

19. Apparatus as specified in claim 17, including a coupling between the output and input circuits of the electronic amplifying and motor drive system adapted to transfer energy from said output circuit to said input circuit which coupling maintains or fails to maintain an oscillating current flow through said system accordingly as said system and its input and output circuits are or are not in an operative condition, and in which a connection between the control grid of said valve and said output circuit operates to provide negative bias for said control grid while said oscillating current is flowing.

20. Apparatus as specified in claim 17, comprising a transformer mutually coupling together the output and input circuits of the electronic amplifying and motor drive system and adapted to transfer energy from said output circuit to said input circuit, which coupling maintains or fails to maintain an oscillating current flow through said system accordingly as said system and its input and output circuits are or are not in an operative condition, in which said cathode is connected to ground, in which said transformer has its primary winding connected between said control winding and ground in parallel with a condenser, and in which the ends of said primary winding and parallel condenser connected to said control winding are also connected to said control grid through a resistor and a parallel connected by-pass condenser to provide negative bias for said control grid while said oscillating current is flowing.

RUDOLF F. WILD.

REFERENCES CITED

The following references are of record in the file of this patent:

UNITED STATES PATENTS

| Number | Name | Date |
| --- | --- | --- |
| 2,228,163 | Cohen | Jan. 7, 1941 |
| 2,234,184 | MacLaren, Jr. | Mar. 11, 1941 |

Certificate of Correction

Patent No. 2,490,010                                       November 29, 1949

RUDOLF F. WILD

It is hereby certified that error appears in the printed specification of the above numbered patent requiring correction as follows:

Column 11, line 54, for the word "effect" read *defect*;

and that the said Letters Patent should be read with this correction therein that the same may conform to the record of the case in the Patent Office.

Signed and sealed this 19th day of September, A. D. 1950.

[SEAL]

THOMAS F. MURPHY,
                                                   *Assistant Commissioner of Patents.*